United States Patent
Salvi

[15] 3,639,828
[45] Feb. 1, 1972

[54] COMPENSATION OF PARASITIC OR STRAY MAGNETIC FIELDS, ESPECIALLY ABOARD AN AIRCRAFT

[72] Inventor: Antoine Salvi, Fontaine, France
[73] Assignee: Commissariat a L'Energie Atomique, Paris, France
[22] Filed: Oct. 15, 1969
[21] Appl. No.: 866,501

[30] Foreign Application Priority Data
Oct. 17, 1968 France.................................170,274

[52] U.S. Cl......................................324/0.5, 324/8, 324/43
[51] Int. Cl................................................G01r 33/08
[58] Field of Search ....................................324/0.5, 43, 4, 8

[56] References Cited

UNITED STATES PATENTS

| | | | |
|---|---|---|---|
| 2,802,983 | 8/1957 | Tolles | 324/43 |
| 2,891,216 | 6/1959 | Linder | 324/43 |
| 3,441,841 | 4/1969 | Salvi | 324/0.5 X |

*Primary Examiner*—Michael J. Lynch
*Attorney*—William D. Stokes

[57] ABSTRACT

A magnetometer head generates a e.m.f. $f_1$ at a frequency $\varphi_1$ proportional to $(H_0 + \Delta H_1)$, value of the total magnetic field intensity at a first point aboard a plane or similar object; a frequency-meter derives from frequency $f_1$ a voltage $e_1$ proportional to $\varphi_1$; at a second point (located aboard said plane or object), where the magnetic field intensity is $(H_0 + \Delta H_2)$, a nuclear filter is fed by e.m.f. $f_1$ and delivers an e.m.f. $f_2$ out of phase with $f_1$ by $d\varphi$ proportional to $(\Delta H_2 - \Delta H_1)$; a phase-meter is fed by $f_1$ and $f_2$ and delivers a voltage $e_2$ proportional to $d\varphi$; an amplifier having an adjustable gain amplifies the output of said phase-meter and delivers a voltage $e_3$; a subtraction unit receives voltages $e_1$ and $e_3$ and delivers a voltage $e_4$ proportional to $(e_1 - e_3)$, said voltage $e_4$ being a measure of the external magnetic field $H_0$ to be measured as $e_1$ is proportional to $(H_0 + \Delta H_1)$ and $e_3$ is proportional (with the same proportionality factor) to $\Delta H_1$ if $\Delta x = x(\sqrt[3]{\rho} - 1)$ and $k_2 \cdot \varphi / k_1 = x/3$ with
$\Delta H_1$ parasitic magnetic field in the first point,
$\Delta H_2$ parasitic magnetic field in the second point,
$\Delta x$ distance between the first and the second point,
$x$ distance of the first point from the barycenter of the parasitic magnetic sources,
$k_1$ the proportionality factor between $f_1$ and $(H_0 + \Delta H_1)$,
$k_2$ the proportionality factor between $f_2$ and $(\Delta H_2 - \Delta H_1)$,
$\varphi$ (function of $x$) adjustable gain of said amplifier,
$\rho$ ratio between $\Delta H_2$ and $\Delta H_1$, i.e. $\rho = \Delta H_2 / \Delta H_1$.

In a modification, at the first point a magnetometerhead, identical to the head located in the first point, is substituted to said filter, and a differential frequency-meter fed by the outputs of both heads is substituted to said phase-meter.

15 Claims, 8 Drawing Figures

INVENTOR
ANTOINE FONTAINE SALVI

INVENTOR
ANTOINE FONTAINE SALVI

BY William D. Stokes
ATTORNEY

Fig. 8.

COMPENSATION OF PARASITIC OR STRAY MAGNETIC FIELDS, ESPECIALLY ABOARD AN AIRCRAFT

The present invention relates to methods and apparatus for the compensation of the parasitic magnetic fields and more particularly, though not exclusively, for the compensation of such fields aboard an aircraft in order to permit a very accurate measurement of the intensity of the earth's magnetic field and its variations, using a magnetometer carried aboard the aircraft.

It is primarily the object of the invention to improve said methods and apparatus in respect both to the accuracy of the compensation and to the suppression of perturbations acting upon the other instruments carried on the aircraft or other compensated carrier.

In the U.S. Pat. No. 3,441,841, issued Apr. 29, 1969 and corresponding to Canadian Pat. No. 809,314 issued Mar. 25, 1969 and to French Pat. No. 1,485,557 issued May 16, 1967, is described:

a method for the compensation of the parasitic or stray magnetic fields, notably aboard an aircraft carrying a magnetometer, characterized by the steps of: determining the difference in total magnetic field at two different points at which the intensity of the external magnetic field is substantially the same but the intensities of the parasitic magnetic field are different; generating a control quantity, more particularly a current intensity, substantially proportional to said difference and hence to the parasitic magnetic field; and producing, under the control of said quantity, a compensating magnetic field directed oppositely to the parasitic magnetic field and of intensity substantially proportional to said quantity whereby to cancel out said difference;

an apparatus for performing the above method, characterized by the fact that it comprises, in combination, means for generating an electric current of intensity substantially proportional to the difference in the magnetic fields at points at which the intensity of the external magnetic field is substantially the same but the intensities of the parasitic magnetic field are different, coils of conductive wire and means for feeding the same with said current, the disposition of said coils and the proportionality factor between said current and said difference being such that said coils generate a compensating magnetic field which cancels out said difference.

This prior art apparatus consequently included coils which generated a compensating magnetic field capable of affecting the other flight instruments, making it in turn necessary to take certain precautions.

In the Tolles U.S. Pat. No. 2,715,198, granted on Aug. 9, 1955, the magnetic perturbations set up by the eddy currents in an aircraft were compensated for by generating, on the basis of the indications of a magnetometer of specific type, a differentiator and a coil, a corrective magnetic field proportional and opposite to the eddy currents.

Further, in his U.S. Pat. No. 2,891,216, granted on June 16, 1959, Frank X. Linder described the compensation provided for a magnetic detection system aboard an aircraft comprising a source of perturbation, the compensated system including a first magnetometer placed at a determinate distance from the source of perturbation, a second magnetometer placed at a greater distance from said source than said predeterminate distance, these two magnetometers being electrically connected in opposition, and means such as an attenuator being provided to nullify the effects of the perturbations in the two magnetometers.

In point of fact, Linder's first and second magnetometers are located at two points in the aircraft where the total magnetic field is $H+kh$, and $H+h$, respectively, where $H$ is the external magnetic field to be measured, $h$ the parasitic magnetic field at the point where the second magnetometer is positioned, and $k$ a constant greater than unity. The output from the first magnetometer is attenuated in the ratio $k$, and the difference between the output from the second magnetometer and the attenuated output from the first magnetometer is determined, which gives a signal proportional to $$(H-h)-1/k(H+kh)=(1-1/k)H.$$

The above system has the disadvantage of not offering a high degree of accuracy for the following reasons:

If $k$ is taken to have a value greatly in excess of unity and more specifically equal to 2, as indicated by way of example in the patent, the two magnetometers will be relatively distant from each other, for they must be positioned at distances proportional to 1 and $\sqrt[3]{k}$ from the source of magnetic perturbation, since the magnetic effect varies inversely as the cube of the distance (as indicated in U.S. Pat. No. 2,891,216, column 1, lines 64 through 66); the two magnetometers will consequently be too remote to be subjected to homothetic stray magnetic fields, so that compensation cannot be rigorously effective on all aircraft headings.

If $k$ is taken to have a low value very close to unity, such as $k=20/19$, then the two magnetometers will be sufficiently close to be subjected to substantially homothetic perturbing magnetic fields, but on the other hand the precision of the system is reduced since it will measure only a small fraction of the field $H$ to be determined, for, with $k=20/19$, the measured magnetic field, or $(1-1/k)H$, is equal to $(1-19/20)H=H/20$; in other words the precision is divided by a factor of 20.

This makes it necessary to adopt a compromise, taking a value for $k$ of approximately 10/9, whereby the measured magnitude becomes $H/10$, giving an order of precision diminished tenfold.

The present invention has for its object to mitigate the above-mentioned drawbacks by providing a degree of accuracy at least equal to that of the aforecited French Pat. No. 1,485,557 in conjunction with an electronic compensation that does not create a parasitic magnetic field in the area in which the customary aircraft instruments are located.

The invention accordingly consists principally, in respect of the method, in generating a first voltage proportional, with a first proportionality factor, to the intensity of the total magnetic field at a first point located at a first distance from the barycenter of the perturbing magnetic fields, in generating a second voltage proportional, with a second proportionality factor, to the difference between the intensities of the total magnetic field at said first point and at a second point located at a second distance from said barycenter, in multiplying said second voltage by a factor $\phi$ dependent upon said first distance, in generating a third voltage proportional, with said first proportionality factor, to the intensity of the perturbing magnetic field at said first point, in subtracting said third voltage from said first voltage whereby to obtain a fourth voltage, and in determining the amplitude of this fourth voltage, which is proportional to the intensity of the external magnetic field to be measured at said first point less the influence of the perturbing magnetic fields, the first distance $x$, the distance $\Delta x$ between said first and second points, the first proportionality factor $K_1$, the second proportionality factor $k_2$, said factor $\phi$ and the ratio $\rho$ between the intensities of the perturbing magnetic fields at said second point and said first point respectively, being related by the formulas:

$$\Delta x = x(\sqrt[3]{\rho}-1) \text{ and } k_2 \cdot \phi/k_1 = x/3;$$

in respect of the apparatus, in causing the same to comprise, in combination: a first magnetometer head located at a first point at a first distance from the barycenter of the perturbing magnetic fields and capable of generating at its output an e.m.f. of frequency proportional to the intensity of the total magnetic field at that first point; a frequency-meter connected to the output of said first magnetometer head whereby to receive said e.m.f. thereon and deduce a first voltage proportional to said frequency and hence to said intensity of the total magnetic field; a second magnetometer head located at a second point at a second distance from said barycenter and forming with said first head a magnetic gradient-meter adapted to deliver a second voltage proportional to the difference between the intensities of the total magnetic field at said second and first points respectively; an adjustable-gain amplifier having its input connected to the output of said gradient-meter whereby to receive said second voltage and deduce therefrom a third voltage; a subtraction unit having two inputs connected respectively to said frequency-meter output whereby to receive said first voltage and to said amplifier output whereby to receive said third voltage, and an output delivering a fourth voltage proportional to the difference between said first voltage applied to its first input and said third voltage applied to its second input; and means for measuring said fourth voltage which is proportional to the intensity of the external magnetic field to be measured at said first point, assuming proper adjustment of the gain of said amplifier and determine positions of said first and second magnetometer heads, substantially on the fore-aft axis of the aircraft or other carrier vehicle wherever possible.

In the preferred forms of embodiment for compensating for the magnetic perturbations set up by eddy currents in an aircraft or other carrier vehicle, recourse is had to the generation, notably by means of at least one coil feedable with a current of adjustable amplitude, in the region of said second point, of a corrective magnetic field proportional to the perturbing field due to the eddy currents, the amplitude of this corrective field being adjusted to cause the barycenter of the magnetic perturbations produced by the eddy currents to coincide with the barycenter of the ferromagnetic masses.

Preferably, said current of adjustable amplitude is supplied by at least one generating coil fixed to the aircraft or other carrier subjected to the eddy current generating magnetic fields.

The description which follows with reference to the accompanying nonlimitative exemplary drawings will give a clear understanding of how the invention can be carried into practice.

In the drawings:

FIG. 3 schematically illustrates the structure and operation of a phase-meter likewise comprising the gradient-meter of FIG. 1;

FIG. 6 schematically represents, in accordance with the second teaching of the invention, the means for compensating for the magnetic perturbations set up by the eddy currents;

FIG. 7 explains the effect produced by the means illustrated in FIG. 6; and

Before describing in detail two preferred embodiments of a compensated magnetometer according to the invention, reference will first be made to FIGS. 1 to 3 for discussion of a preliminary stage the object of which is to study the barycenter of the perturbing fields due to the ferromagnetic masses and to determine the position thereof.

Use is accordingly made of a magnetic gradient-meter of the kind described in the applicant's French Pat. No. 1,485,556 filed on Feb. 4, 1966, namely one having two probes or measuring heads positioned at some distance (approximately 1.50 meters for instance) from each other, such a gradient-meter determining the difference (or gradient) between the intensities of the total magnetic field to which the two heads are subjected.

Determination of the barycenter of the perturbing magnetic fields is based on the fact that the variations in the external magnetic field (produced by the region overflown by the aircraft) result in a zero magnetic gradient between the two heads, whereas conversely all the magnetic perturbations caused by the aircraft produce a nonzero magnetic gradient.

If the barycenter of the ferromagnetic masses associated with the perturbing aircraft fields should shift while the aircraft is in flight, within a space the dimensions of which are small compared with the distance between the heads of the magnetic gradient-meter, then the variations in the magnetic gradient determined by the gradient-meter will have the same aspect and the same phase as the perturbation, and this in a ratio of constant amplitude (there is true similarity, in aspect and position, between these variations and the perturbations).

As will be explained hereinafter, this makes it possible to very exactly compensate, by the method and/or the apparatus according to this invention, for the effects due to the aircraft without distortion, or division by some factor (such as the factor $(1-1/k)$ in the aforesaid U.S. Pat. No. 2,891,216), of the signal representing the intensity of the external magnetic field to be measured.

It should be noted that a precise determination of the said barycenter(s) and self-compensation for the stray magnetic fields requires that the magnetic gradient be measured with very great accuracy, for a perturbation of one gamma ($1\gamma$) on the probe or measuring head will produce a field differential of $0.2\gamma$ at a distance of 1.50 meters. This implies achieving accuracy in measurement to the order of $0.01\gamma$ and a constant difference (i.e., the same value for the magnetic gradient) irrespective of the aircraft heading. Now the magnetic gradient-meter according to the aforesaid French Pat. No. 1,485,556, the principle of which will now be recalled, makes it possible to measure variations in magnetic field intensity of the order of $0.001\gamma$, or $0.01\mu G$, between two points. Once recorded, these variations reveal the general aspect of the magnetic perturbations.

Figure 1:
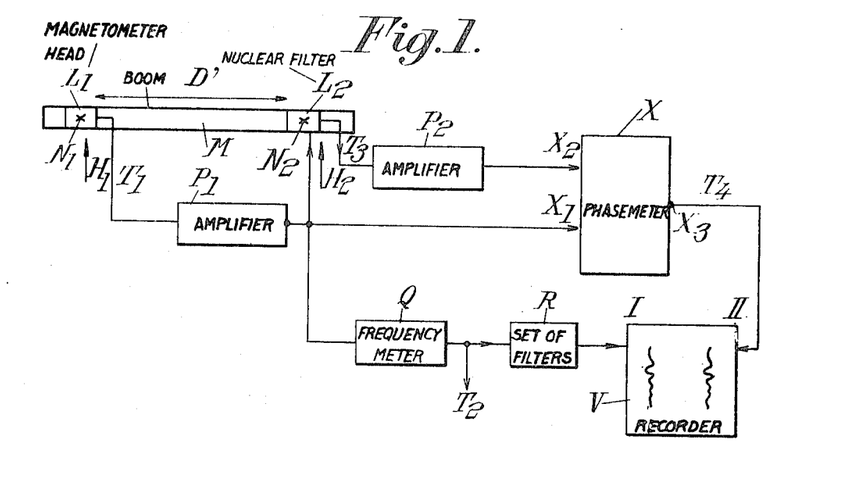
FIG. 1 is a diagrammatic illustration of a gradient-meter used to accomplish a preliminary stage in the process of compensating the magnetometer, to wit determining the gradient of the perturbing magnetic fields and the position of the barycenter thereof.

FIG. 1 is a highly diagrammatic illustration of the structure of a magnetic gradient-meter according to the said French Pat. No. 1,485,556. In its current version, this gradient-meter comprises two probes or heads $L_1$ and $L_2$ spaced by 1.50 m. ($D'=1.50$ m.) and enclosed in a boom M made of rigid plastic (in order to maintain the two heads $L_1$ and $L_2$ in a fixed mutual relationship) which is "transparent" to magnetic fields.

The head or probe $L_1$, which is preferably of the spin-coupling type, functions as a nuclear oscillator, that is to say that it delivers a voltage $T_1$ at the Larmor frequency of the nuclear spins it contains, which frequency is strictly proportional to the intensity of the total magnetic field sensed at the point $N_1$ by probe $L_1$. This voltage $T_1$ is amplified in an amplifier $P_1$ and its frequency is generally measured in a frequency-meter Q which delivers a voltage $R_2$ proportional to said frequency. This voltage $T_2$ is filtered through a set of filters R before being recorded on channel I of a recorder V.

The second head or probe $L_2$ is a nuclear filter which receives the voltage $T_1$, amplified in amplifier $P_1$, at the angular frequency $\omega_1=\gamma H_1$, where $\gamma$ is the gyromagnetic ratio of the nuclear spins and $H_1$ the intensity of the total magnetic field at $N_1$. Nuclear filter $L_2$ is a bandpass filter centered on the angular frequency $\omega_2=\gamma H_2$, where $H_2$ is the intensity of the total magnetic field at $N_2$, it being assumed that the nuclear filter has the same nuclear spins (of gyromagnetic ratio $\gamma$) as the nuclear oscillator $L_1$ forming the first head. The amplitudewise response curve, namely the voltage $T_3$ issuing from $L_2$ as a function of $\omega_2$, is given by the upper curve in FIG. 2.

Figure 2:
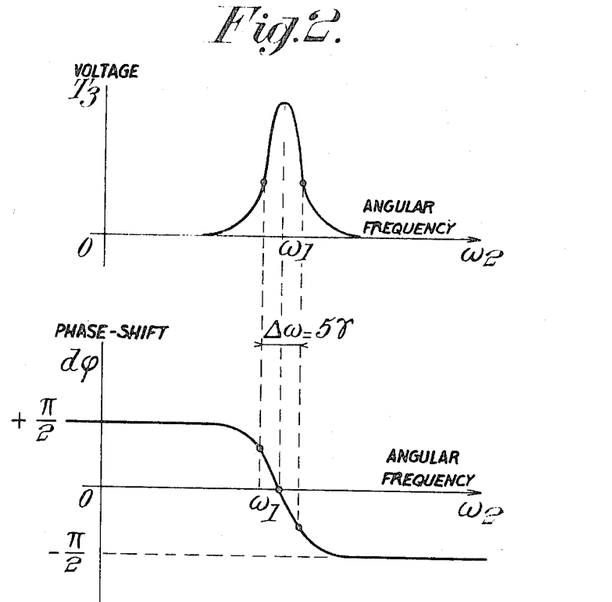
FIG. 2 portrays the functional characteristics of a nuclear filter comprising the gradient-meter of FIG. 1.

The nuclear filter also has the effect of phase-shifting $T_3$ with respect to $T_1$ when $\omega_2$ differs from $\omega_1$, as shown by the lower curve in FIG. 2 which plots the phase-shift $d\phi$ between $T_3$ and $T_1$ against $\omega_2$. In fact, when $H_1=H_2$, $\omega_1=\omega_2$ and the phase shift $d\phi$ introduced by the nuclear filter $L_2$ is null, but as soon as a magnetic field gradient $dH$ appears between the points $N_1$ and $N_2$, then $\omega_2$ differs from $\omega_1$ and a phase-shift $d\phi$ is introduced by the filter. The change in phase is very rapid, being equal to $\pi/2$ ($d\phi$ changes from $-\pi/4$ to $+\pi/4$) for a change in $dH$ of $5\gamma$, thus endowing the gradient-meter with a very great sensitivity.

The voltage $T_3$ issuing from nuclear filter $L_2$ is amplified in an amplifier $P_2$ and the difference in phase between the voltages $T_1$ and $T_3$ amplified in amplifiers $P_1$ and $P_2$ is determined in a phasemeter X (having two inputs $X_1$ and $X_2$) which delivers (on its output $X_3$) a voltage $T_4$ proportional to $d\phi$, and this voltage $T_4$ is recorded on channel II of recorder V in parallel with the voltage $T_2$ which is recorded on the same recorder's channel I after being filtered by the filters R.

FIG. 3 recalls the structure and theory of operation of the phasemeter X of FIG. 1. This phasemeter has two channels $Y_1$ and $Y_2$, comprising in series:

in the case of the former, a phase-inverter $q$, a shaping unit $h_1$ (of the Schmitt-trigger type) and a differentiating and rectifying unit $j_1$ having a capacitor $m_1$, diodes $n_1$ and $p_1$ and a resistor $r_1$; and, in the case of the latter, a shaping unit $h_2$ (of the Schmitt trigger type) and a differentiating and rectifying unit $j_2$ having a capacitor $m2$, diodes $n_2$ and $p_2$ and a resistor $r_2$.

The two channels $Y_1$ and $Y_2$ drive the two inputs (for respectively switching from the first to the second stage and from the second to the first stage) of a flip-flop of the Eccles-Jordan type, one output of which drives an integrator $v$ the output of which constitutes the output $X_3$ of phase-meter X.

Phase-meter X functions in the following manner:

Assuming first that $d\phi$ is zero, then the two voltages $T_1^1$ (deduced from $T_1$ by amplification in $P_1$ and phase inversion in $g$) and $T_2^1$ (deduced from $T_2$ by amplification in $P_2$) will be in exact phase opposition, as shown; this also applies in the case of the pulses $T_1^2$ and $T_2^2$ shaped in $h_1$ and $h_2$ respectively. The positive pulses $T_2^3$ corresponding to the front edges of $T_2^2$ then position themselves exactly between the positive pulses $T_1^3$ corresponding to the front edges of $T_1^2$; as a result, the flip-flop $s$ remains for equal periods in each state and therefore delivers a signal $T^o$ having equal half-waves, and the integrator $v$ delivers null voltage.

Conversely, as soon as $d\phi$ is no longer equal to zero, the pulses $T_2^3$ no longer position themselves exactly between two pulses $T_1^3$, so that the half-waves of $T^o$ become asymmetrical and the integrator $v$ delivers a positive or negative voltage (depending on the source of the phase-shift $d\phi$ and hence of the magnetic gradient) which is not zero and which is delivered on $X_3$ and recorded on channel II of recorder V. By way of example, it has been possible to obtain an integrated voltage $T_4$ of $\pm 5$ volts for a phase-shift of $\pm \pi/4$, itself obtained for a gradient of $\pm 5$ $\gamma$. Since the electronic noise in the unit is under one millivolt, it was therefore possible to sense to within 0.001 $\gamma$.

Lastly, the recorder V records by virtue of the precision of phase-meter X and that of frequency-meter Q, which could be of the kind described in the applicant's first Certificate of Addition No. 88,663 granted on Jan. 30, 1967 (appended to the applicant's French Pat. No. 1,430,874 granted on Dec. 31, 1966)—simultaneously, side by side, the gradient of the magnetic field (in point of fact, the tail gradient of the aircraft) and the absolute value of the total magnetic field.

FIG. 1 as a whole consequently furnishes, in respect of the magnetic perturbations due to the aircraft, $\Delta H_1$ (the magnetic perturbation at $N_1$) and $(\Delta H_2 - \Delta H_1)$ which is the difference between $\Delta H_2$, the magnetic perturbation at $N_2$, and $\Delta H_1$, this being effected with great precision.

Figure 4:
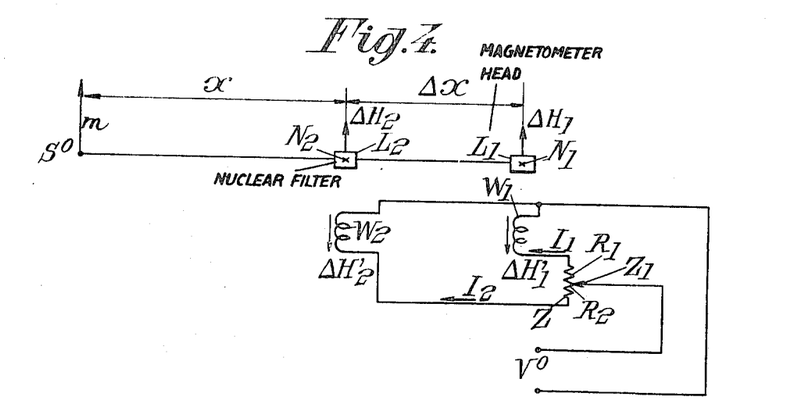
FIG. 4 is a diagrammatic showing of the circuitry comprising the gradient-meter of FIG. 1 and utilized to determine the position of the barycenter of the perturbing fields.

It will be shown by reference to FIG. 4 that it is possible to deduce, with a good degree of precision and by means of simple circuitry, the distance $x$ separating the barycenter (of the ferromagnetic masses) from probe $L_2$, for instance. By ascertaining this difference along each of the main headings, it is possible to assess the positional stability of the barycenter and to define the self-compensation possibilities for each type of aircraft or other carrier vehicle.

On FIG. 4 are to be seen the two heads $L_1$ and $L_2$ of FIG. 1, the head $L_2$ being closer to the source of perturbations $S^o$ (the barycenter of the magnetic perturbations) producing a magnetic perturbation of intensity $\Delta H_1$ at $N_1$, where the head $L_1$ is located, and a magnetic perturbation of intensity $\Delta H_2$ at $N_2$, where the head $L_2$ is located at a distance of $\Delta x$ (actually 1.50 meters) from $L_1$.

The exemplary compensation system of FIG. 4 includes: a source of compensating voltage $V^o$, a voltage distributor or divider Z having a slide $Z_1$ which distributes the voltage $V^o$ between the partial resistors of value $R_1$ and $R_2$, and two coils $W_1$ and $W_2$ crossed respectively by currents $I_1$ and $I_2$ proportional to $R_1$ and $R_2$ respectively, said coils $W_1$ and $W_2$, respectively generating compensating magnetic fields $\Delta H'_1$ and $\Delta H'_2$ proportional to $I_1$ and $I_2$ respectively.

For a complete compensation, we have:

$$\frac{R_2}{R_1} = \frac{I_2}{I_1} = \frac{\Delta H'_2}{\Delta H'_1} = \frac{\Delta H_2}{\Delta H_1} = \rho$$

The requirement $\Delta H_2/\Delta H_1 = \rho$ is met when the following three requirements are also met:

The heads $L_1$ and $L_2$ must have a high degree of accuracy of the order of 0.01 $\gamma$ at least, irrespective of the position of the magnetometer heads in relation to the direction of the field;

The distance $\Delta x$ must be very exactly known and small in comparison with $x$ ($x/\Delta x > 10$);

Adjustment of the currents $I_1$ and $I_2$ must ensure compensation.

When these three requirements are met, $x$ can be calculated from $\Delta x$, which is known, and from $\rho$, which is determined by the divider Z. For taking $m$ as the perturbing mass at $S^o$, we have:

$$\Delta H_2 = \frac{m}{2\pi x^3} \text{ and } \Delta H_1 = \frac{m}{2\pi (x + \Delta x)^3}$$

and $$\frac{\Delta H_2}{\Delta H_1} = \frac{(x + \Delta x)^3}{x^3} = 1 + \frac{3\Delta x}{x} + \frac{3(\Delta x)^2}{x^2} + \frac{(\Delta x)^3}{x^3} = \rho.$$

Taking $X = \frac{\Delta x}{x}$, we have:

$$\rho = 1 + 3X + 3X^2 + X^3, \text{ or}$$

$$\rho = (1 + X)^3, \text{ viz:}$$

$$1 + X = \sqrt[3]{\rho}, \text{ so that } \frac{\Delta x}{x} = X = \sqrt[3]{\rho} - 1.$$

Whence $x = \frac{\Delta x}{\sqrt[3]{\rho} - 1}$.

Thus it is indeed possible to compute $x$ from $\Delta x$ and $\rho$.

In practice, adjustment of the currents $I_1$ and $I_2$ in the compensation coils $W_1$ and $W_2$ is effected during specific motions of the aircraft on each heading (e.g., a rolling motion with an amplitude of $\pm 10°$ and a period of 6 seconds). $I_1$, $I_2$ and $V^o$ are operated upon so as to simultaneously obtain $\Delta H_1 - \Delta H'_1 = 0$ and $(\Delta H_2 - \Delta H'_2) - (\Delta H_1 - \Delta H'_1) = 0$, whereupon the ratio of the resistances $R_2/R_1$ (which can be read off on divider Z, which divider may be a ten-turn graduated potentiometer) gives $I_2/I_1$, namely $\rho$.

Measurement of the barycenter distance $x$, described precedingly with reference to FIGS. 1 through 4, will enable the magnetic perturbations due to the aircraft to be compensated for in accordance with the method and apparatus of the aforesaid French Pat. No. 1,485,557: it will suffice to apply to the compensation coils 16, 17 of that patent the voltage representing the difference $(\Delta H_2 - \Delta H_1)$. However, the great accuracy with which the method hereinbefore described provides a measurement of the magnetic field gradient in the region of sensor $L_1$ authorizes direct electronic compensation by subtracting, from the voltage $T_2$ which is delivered by frequency-meter Q and is proportional to the intensity of the total magnetic field $(H_1 + \Delta H_1)$ at $N_1$, a voltage proportional to $\Delta H_1$ that is reconstituted by applying the principal teaching of the invention, as will be set forth hereinbelow in detail with reference to FIG. 5.

The explanations relevant to the preliminary stages in the study of the perturbing fields being thus complete, there will now be described how the teachings of this invention can be applied to compensate respectively for the stray fields due to the ferromagnetic masses of the aircraft (FIG. 5) and the eddy currents (FIGS. 6 and 7).

The great sensitivity of the gradient measurement makes it possible to move the two heads (nuclear oscillator and nuclear filter) of the subject device of this invention, which correspond to the heads $L_1$ and $L_2$ of FIG. 4, closer to within a small distance of each other, 1 meter for instance.

It is then possible to write directly the classic equation:

$$x \cdot \frac{d(\Delta H_1)}{dx} = 3\Delta H_1,$$

due to the fact that $H$ varies as $1/x^3$ (the symbol $d/dx$ representing the derivative with respect to $x$). When $\Delta x$ is small, the difference $(\Delta H_2 - \Delta H_1)$ substantially represents $$\frac{d(\Delta H_1)}{dx}.$$

Because the phase of the signals obtained is rigorous, it will suffice to achieve the condition $$\Delta H_1 - \frac{x}{3} \cdot \frac{d(\Delta H_1)}{dx} = 0$$

to completely nullify the influence of the magnetic masses of the aircraft at the location of the head or probe $L_1$.

All that is therefore necessary is to multiply $$\frac{d(\Delta H_1)}{dx}$$

(or $\Delta H_2 - \Delta H_1$) by a constant factor $x/3$ and to subtract this value from the measurement taken by the head $L_1$ to cancel out the perturbations produced by these magnetic masses at $N_1$, since $\Delta H_1$, which is to be compensated for, is equal precisely to $$\frac{x}{3} \cdot \frac{d(\Delta H_1)}{dx}.$$

Figure 5:
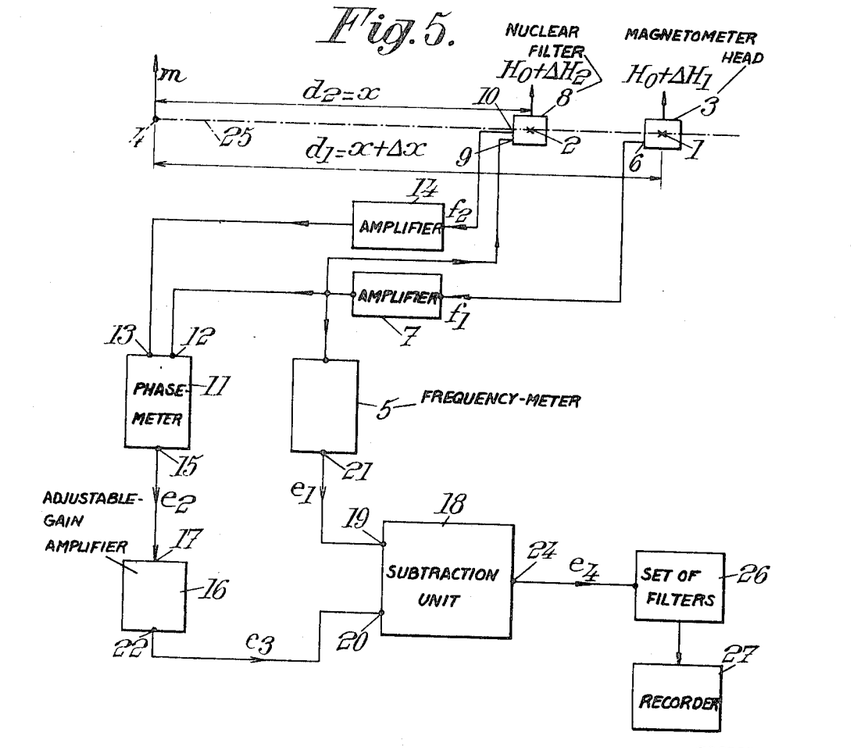
FIG. 5 is a block diagram illustrating a first embodiment of a compensated magnetometer according to this invention.

A device for performing the above operations is illustrated in FIG. 5. It comprises in combination:

a magnetometer head 3 (consisting for instance of a nuclear oscillator of the kind described in the aforesaid French Pat. No. 1,485,556) located at the first point 1 at a first distance $d_1$ ($d_1 = x + \Delta x$) from the barycenter 4 of the perturbing magnetic fields (with the arrow $\vec{m}$ representing the perturbing magnetic fields) and capable of generating a first e.m.f. $f_1$ of frequency proportional to the intensity $(H + \Delta H_1)$ of the total magnetic field ($H_o$ being the external magnetic field to be measured and $\Delta H_1$ the perturbing field at the point 1) at said first point 1;

a frequency-meter 5 (for instance of the type described in the aforesaid French Certificate of Addition No. 88,663) connected to the output 6 of said magnetometer head 1 1—preferably via an amplifier 7—whereby to deduce from said first e.m.f. $f_1$ a first voltage $e_1$ proportional to said frequency and hence to said intensity $(H_o + \Delta H_1)$ of the total magnetic field;

a nuclear filter 8 (preferably of the type described in the aforesaid French Pat. No. 1,485,556) positioned at a second point 2 at a second distance $d_2$ ($d_2 = x$) from said barycenter 4 and having its input 9 connected to the output 6 of said head 1—preferably via the amplifier 7—whereby to receive therefrom said first e.m.f. $f_1$ and deliver on its output 10 a second e.m.f. $f_2$ which, with respect to said first e.m.f. $f_1$, presents a phase difference proportional to the difference $(\Delta H_1 - \Delta H_1)$ between the intensities $(H_o + \Delta H_2)$ and $(H_o + \Delta H_1)$ of the total magnetic field at the second point 2 and the first point 1 ($\Delta H_2$ being the perturbing field at the point 2);

a phasemeter 11 (for instance of the type described in the aforesaid French Pat. No. 1,485,556 and illustrated in FIG. 3 of the drawings accompanying the present description) having two inputs 12, 13 connected respectively to the output 6 of said magnetometer head 1—preferably via the amplifier 7— (whereby to receive therefrom said first e.m.f. $f_1$) and to the output 10 of nuclear filter 8—preferably via an amplifier 14— whereby to receive therefrom said second e.m.f. $f_2$, and an output 15 which delivers a second voltage $e2$ proportional to said difference $(\Delta H_2 - \Delta H_1)$ between the intensities of the total magnetic field;

an adjustable-gain amplifier 16 the input 17 of which is connected to the output 15 of said phasemeter 11 whereby to receive said second voltage $e_2$ and deduce therefrom a third voltage $e_3$;

a subtraction unit 18 having two inputs 19, 20 connected respectively to the output 21 of said frequency-meter 5 whereby to receive therefrom said first voltage $e_1$ and to the output 22 of said amplifier 16 whereby to receive therefrom said third voltage $e_3$, and an output 24 delivering a fourth voltage $e_4$ proportional to the difference between said first voltage $e_1$ applied to its first input 19 and said third voltage $e_3$ applied to its second input 20; and means for measuring said fourth voltage $e_4$ which is proportional to the intensity $H_o$ of the external magnetic field to be measured at said first point 1, assuming proper adjustment of the gain of amplifier 16 and determinate positions of said magnetometer head 3 and said nuclear filter 8, to wit substantially on the fore-aft axis 25 of the aircraft or other carrier vehicle wherever this is possible, said means including for instance a filter set 26 for filtering the desired components of $e_4$, followed by a recorder 27.

The above-described system functions in the following manner:

The nuclear oscillator or magnetometer head 3 delivers an e.m.f. $f_1$ of frequency $f$ proportional to $(H_o + \Delta H_1)$. This e.m.f. $f_1$, amplified in amplifier 7, is delivered:

to the frequency-meter 5 which delivers a voltage $e_1$ of amplitude $a_1 = k_1 (H_o + \Delta H_1)$, where $k_1$ is a constant;

to nuclear filter 8 which delivers an e.m.f. $f_2$ the phase-shift $d\phi$ of which with respect to the e.m.f. $f_1$ delivered by oscillator 3 is proportional to $(\Delta H_2 - \Delta H_1)$, to phasemeter 11 which also receives the e.m.f. $f_2$ delivered by filter 8 and amplified in amplifier 14 and delivers a voltage $e_2$ of amplitude $a_2 = k_2(\Delta H_2 - \Delta H_1)$, where $k_2$ is a constant which may be equal to $k_1$. The voltage $e_2$ is multiplied in amplifier 16 by a factor $\phi$ dependent upon the distance $d_1 = x$, so as to obtain a voltage $e_3$ of amplitude $a_3 = \phi(x) k_2 (\Delta H_2 - \Delta H_1)$. The value $\phi(x)$ is chosen so that the requirement $k_2 \phi / k_1 = x/3$ is met, for then $a_3 = k_1 x / 3 (\Delta H_2 - \Delta H_1)$.

It is to be noted that if $k_2 = k_1$, then $\phi = x/3$.

The subtraction unit 18 thus receives a voltage $e_1$ of amplitude $a_1 = k_1(H_o + \Delta H_1)$ on its input 19 and a voltage $e_3$ of amplitude $$a_3 = k_1 \frac{x}{3} (\Delta H_2 - \Delta H_1) \simeq k_1 \frac{x}{3} \frac{d(\Delta H_1)}{dx} = k_1 \Delta H_1$$

(as explained hereinbefore with reference to FIG. 4) on its input 20 and consequently delivers on its output 24 a voltage $e_4$ amplitude $a_4 = k_1(H_o + \Delta H_1) - k_1 \Delta H_1 = k_1 H_o$. This shows that the amplitude $a_4$ of the voltage $e_4$ is strictly proportional to the field $H_o$ to be measured. It is to be noted that the coefficient $k_1$ is by no means a fraction factor like the factor $(1 - 1/k)$ of the aforesaid U.S. Pat. No. 2,891,216, which reduces accuracy, but merely a proportionality factor resulting from the amplifier 7 and the frequency-meter 5, which start with an e.m.f. $f_1$ not divided by a reduction factor.

The voltage $e_4$ represents the intensity of the earth's magnetic field $H_o$ (to which it is strictly proportional) and its perturbations, regardless of the motions described by the carrier aircraft or the magnetic masses thereof (but with the proviso to be made hereinbelow in respect of eddy currents).

The bandpass filter or set thereof 26 allows the recorder 27 to record anomalies with frequencies corresponding to those of the sought after anomalies and permits maximum possible elimination of the natural perturbations and gradients (horizontal and vertical) of the earth's magnetic field.

As it has just been described, the system for compensating for the magnetic effects due to the aircraft or other carrier vehicle is nonetheless incomplete since the motion of the aircraft through the earth's magnetic field generates eddy currents in the conducting surfaces of the aircraft, notably the fuselage, and these eddy currents distribute stray magnetic fields which are all the greater as the flight speed of the aircraft is higher.

Fortunately, the structural symmetry of the aircraft or carrier vehicle enables these phenomena to be compensated for in the same way as permanent or induced parasitic magnetic fields. Only the location of the barycenter of the magnetic forces due to eddy currents differs from that of the barycenter of permanent or induced magnetic fields. Therefore, in order to make a single overall compensation setting possible (as indicated precedingly), it is necessary to make these two barycenters coincide and to consequently alter the aspect of the magnetic field gradient produced by the eddy currents. An explanation will now be given of how this can be accomplished (see FIGS. 6 and 7).

In accordance with a second teaching of this invention, the process for compensating for magnetic perturbations engendered by eddy currents in the aircraft or other vehicle (having its axis as at 25 in FIG. 6) includes the steps of generating—notably by means of coils 28 energizable with the voltage picked off a set of generating coils 29 which have mutually orthogonal axes and are rigidly connected to the aircraft, said voltage being adjustable for amplitude by an adjustable resistor 30—adjacent said second point 2 (at which filter 8 is located, oscillator 3 being located at the point 1), a corrective magnetic field $\Delta h_3$ in phase opposition with the perturbing field $\Delta h_2$ resulting from the barycenter of the eddy currents, the value of this corrective field $\Delta h_3$ being set so as to cause said barycenter of the magnetic perturbations produced by the eddy currents to coincide with the barycenter of the ferromagnetic masses (the barycenter of the eddy currents being shifted from its real position Br to its virtual position Bv by the corrective field $\Delta h_3$).

More precisely, consideration may be given to the case of the magnetic fields generated by the motions of the fuselage during North-South and South-North pitching motions. The real barycenter Br produces on the head 3 and the filter 8 field variations which are $\Delta h_1$ and $\Delta h_2$ respectively. The coils 28 generate a field $-\Delta h_3$ (in phase opposition with $\Delta h_2$). The resulting gradient $(\Delta h_2 - \Delta h_3) - \Delta h_1$, for a constant $\Delta h_1$, gives a virtual barycenter in relation to the head 3 that appears to be all the farther as $(\Delta h_2 - \Delta h_3)$ is closer to $\Delta h_1$: the barycenter moves towards infinity as $(\Delta h_2 - \Delta h_3)$ tends towards $\Delta h_1$ (FIG. 7). By using adjustable resistor 30 to set the current intensity through the coils 28 and hence the intensity of the field $\Delta h_3$, it is thus possible to shift the eddy-current barycenter to make it coincide with the barycenter of the ferromagnetic masses (the barycenter of the eddy currents moves from its real position Br to its virtual position bv which is the barycenter of the ferromagnetic masses). In FIG. 7, the curves 31 and 32 represent the gradients due to the virtual barycenter and the real barycenter of the eddy currents respectively.

This possibility stems from the formula established precedingly, namely $x = \dfrac{\Delta x}{\sqrt[3]{\rho'} - 1}$, with $\rho' = \dfrac{\Delta h_2 - \Delta h_3}{\Delta h_1}$.

If, with $\Delta h_1$ constant, $\Delta h_3$ is caused to vary, then $\rho'$ will vary, resulting in an apparent variation of $x$ (in addition to the value $x$, FIG. 7 bears the value $x'$ corresponding to the real barycenter Br).

Since the measurements of the distances of the barycenters of the eddy currents and of the ferromagnetic masses reveal, in the case of the eddy currents, a resultant perturbation closer to the points 1 and 2 than in the case of the ferromagnetic masses, $\Delta h_3$ must be negative, which, when the resistor 30 is adjusted, causes an apparent receding of the eddy-current barycenter, which shifts from Br to Bv, as shown.

It should be noted that, instead of being energized by generating coils subjected to the eddy-current-generating magnetic field, the coils 28 can if necessary be energized by any other means capable of producing a current similar to these eddy currents, such as a minicomputer for instance.

Figure 8:
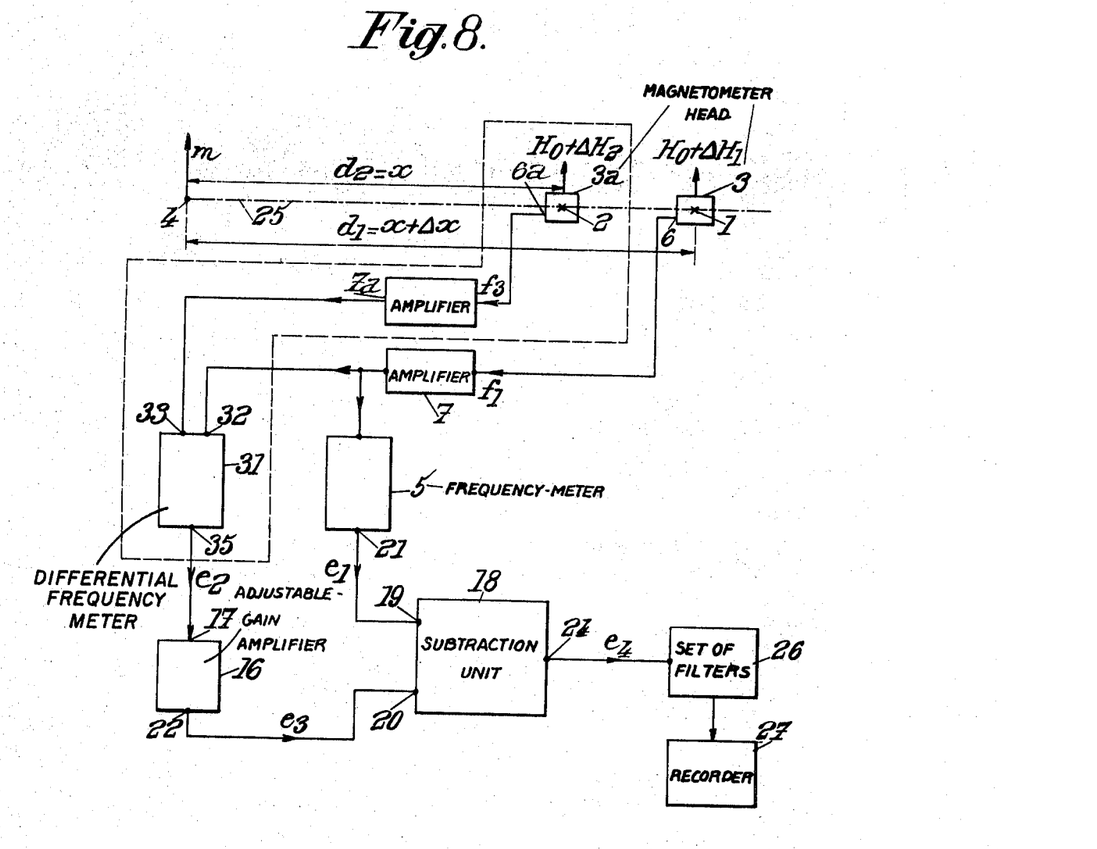
FIG. 8 is a block diagram of a second form of embodiment of a compensated magnetometer according to this invention.

Lastly, FIG. 8 illustrates a second form of embodiment of a compensated magnetometer according to the invention, the circuitry in FIG. 8 being a variant on that shown in FIG. 5 (in point of fact, FIG. 8 differs from FIG. 5 only in respect of the portion boxed in with broken lines in FIG. 8).

The compensated magnetometer in FIG. 8 comprises, in combination:

a first magnetometer head of the same type as the magnetometer head 3 in FIG. 5 and located at a first point 1 at a distance $d_1$ from the barycenter 4 of the perturbing magnetic fields, this head being capable of generating, on its output, a first e.m.f. $f_1$ at a frequency proportional to the intensity $(H_o + \Delta h_1)$ of the total magnetic field at that point 1;

a frequency-meter 5 of the same type as the frequency-meter 5 in FIG. 5, connected to the output 6 of magnetometer head 1—preferably via an amplifier 7—and deducing from the e.m.f. $f_1$ a first voltage $e_1$ proportional to the frequency of the e.m.f. $f_1$ and hence to $(H_o + \Delta h_1)$;

a second magnetometer head 3a identical to magnetometer head 3, located at a second point 2 at a second distance $d_2$ $(d_2 = x)$ from the barycenter 4 and capable of generating a second e.m.f. $f_3$ at a frequency proportional to the intensity $(H_o + \Delta h_2)$ of the total magnetic field at that second point 2;

a differential frequency-meter 31 (for instance of the type described in the patent application filed by the Applicant in this country on Oct. 14, 1969 for "differential frequency-meter") having two inputs 32, 33 connected respectively to the output 6 of said magnetometer head 1, preferably via amplifier 7, whereby to receive the first e.m.f. $f_1$ therefrom, and to the output 6a of the second magnetometer head 3a, preferably via an amplifier 7a, whereby to receive the second e.m.f. $f_3$ therefrom, and an output 35 which delivers a second voltage $e_2$ proportional to the difference $(\Delta H_2 - \Delta H_1)$ between the intensities of the total magnetic field at the points 2 and 1;

an adjustable-gain amplifier 16 having its input 17 connected to the output 35 of said differential frequency-meter 31 whereby to receive the second voltage $e_2$ and deduce therefrom a third voltage $e_3$;

a subtraction unit 18 having two inputs 19, 20 respectively connected to the output 21 of frequency-meter 5 and to the output 22 of amplifier 16, whereby to receive $e_1$ and $e_3$ therefrom respectively, this unit 18 delivering from its output 24 a fourth voltage $e_4$ proportional to the difference between $e_1$ and $e_3$; and means for measuring said fourth voltage $e_4$ which is proportional to the intensity $H_o$ of the external magnetic field to be measured at said point 1, assuming proper adjustment of the gain in amplifier 16 and determinate positions of said magnetometer heads 3 and 3a, said means including for instance a filter set 26 followed by a recorder 27.

The magnetometer in figure 8 functions in the following manner:

The nuclear oscillators or magnetometer heads 3 and 3a respectively deliver an e.m.f. $f_1$ of frequency proportional to $(H_o + \Delta H_1)$ and an e.m.f. $f_3$ of frequency proportional to $(H_o + \Delta H_2)$. These e.m.f. $f_1$ and e.m.f. $f_3$ are amplified in amplifiers 7 and 7a respectively.

The differential frequency-meter 31 determines the difference between the frequencies of the e.m.f. $f_1$ and e.m.f. $f_3$ and delivers from its output 35 a voltage $e_2$ of amplitude $a_2 = k_2(\Delta H_2 - \Delta H_1)$, where $k_2$ is a constant which may be equal to $k_1$ while frequency-meter 5 measures the frequency of the e.m.f. $f_1$ and consequently delivers a voltage $e_1$ of amplitude $a_1 = k_1(H_o + \Delta H_1)$, where $k_1$ is a constant.

In the embodiment shown in figure 8, the voltage $e_2$ is multiplied in amplifier 16 by a factor $\phi$ dependent on the distance $d_1 = x$, so as to obtain a voltage $e_3$ of amplitude $a_3 = \gamma(x)k_2(\Delta H_2 - \Delta H_1)$. $\phi(x)$ is chosen so that the requirement $k_2\phi/k_1 = x/3$ is met, for then $a_3 = k_1 x/3 (\Delta H_2 - \Delta H_1)$.

It is to be noted that if $k_2 = k_1$, then $\phi = x/3$.

Hence, as with the embodiment of FIG. 5, the subtraction unit 18 receives a voltage $e_1$ of amplitude $a_1 = k_1(H_o + \Delta H_1)$ on its input 19 and a voltage $e_3$ of amplitude $$a_3 = k_1 \frac{x}{3}(\Delta H_2 - \Delta H_1) \simeq k_1 \frac{x}{3} \frac{d(\Delta H_1)}{dx} = k_1 \Delta H_1$$

(as explained hereinbefore with reference to FIG. 4) on its input 20 and consequently delivers from its output 24 a voltage $e_4$ of amplitude $a_4 = k_1(H_o + \Delta H_1) - k_1\Delta H_1 = k_1 H_o$.

It may be seen therefore that the amplitude $a_4$ of the voltage $e_4$ is strictly proportional to the field $H_o$ to be measured.

The circuitry of FIG. 8 offers the same advantages as that of FIG. 5, but with the additional possibility of operating in real time with a faster response since it is devoid of a nuclear filter (in which the spins are subjected to the magnetic field at the point 2 and which receives, on its input, an e.m.f. of frequency proportional to the magnetic field at point 1).

A compensated magnetometer devised in accordance with either of the precedingly described embodiments offers numerous advantages by comparison with prior art magnetometers, the following being outstanding:

The degree of accuracy obtained is very high.

All parasitic or stray magnetic fields are automatically compensated for.

The compensation process produces neither harmful magnetic fields in the region where the instruments aboard the aircraft or other carrier vehicle are located (as in the case of the aforesaid French Pat. No. 1,485,557) nor a reduction in the useful signal proportional to the intensity of the magnetic field to be measured (as in the case of the aforesaid U.S. Pat. No. 2,891,216).

It goes without saying that many changes may be made to the forms of embodiment described hereinabove without departing from the scope of the invention and that, broadly speaking, the invention is by no means limited to the exemplary applications considered herein.

What is claimed is:

1. A method of compensating for perturbing magnetic fields in a carrier vehicle in order to permit the accurate measurement of the intensity of an external magnetic field and its perturbations, comprising the steps of:

generating a first voltage proportional, with a first proportionality factor $k_1$, to the intensity of the total magnetic field at a first point, located in the carrier vehicle, at a first distance $x$ from the barycenter of the perturbing magnetic fields;

generating a second voltage proportional, with a second proportionality factor $k_2$, to the difference between the intensities of the total magnetic field at said first point and at a second point, located in the carrier vehicle, at a second distance from said barycenter;

multiplying said second voltage by a factor $\phi$ dependent on said first distance to obtain a third voltage proportional, with said first proportionality factor, to the intensity of the perturbing magnetic field at said first point;

subtracting said third voltage from said first voltage to obtain a fourth voltage; and, determining the amplitude of said fourth voltage, which is proportional to the intensity of the external magnetic field to be measured at said first point, rid of the influence of the perturbing magnetic fields;

the first distance $x$, the distance $\Delta x$ between said first and second points, the first proportionality factor $k_1$, the second proportionality factor $k_2$, said factor $\phi$, and the ratio $\rho$ between the intensities of the perturbing magnetic fields at said second point and said first point respectively being related by the formulas $\Delta x = x (\sqrt[3]{\rho} - 1)$ and $k_2 \cdot \phi / k_1 = x/3$.

2. A method according to claim 1 including the additional step of generating, in order to compensate for the proportion of the perturbing magnetic fields engendered by eddy currents in the carrier vehicle, a corrective magnetic field adjacent said second point and proportional to said proportion of the perturbing magnetic fields engendered by eddy currents in the carrier vehicle, the amplitude of said corrective magnetic field being set so as to cause the barycenter of the proportion of the perturbing magnetic fields engendered by said eddy currents to coincide with the barycenter of the perturbing magnetic fields caused by the ferromagnetic mass of the carrier vehicle.

3. A method according to claim 1 wherein the steps of determining the ratio $\rho$ include:

disposing two coils at said first and second points;

energizing each coil from a variable source of current;

causing the carrier vehicle to describe predetermined motions in predetermined directions;

measuring the magnetic field at the first point and the magnetic field gradient between the first and second points; and, adjusting the amplitudes of each of the variable currents applied to said coils until, simultaneously, said magnetic field remains constant and said magnetic field gradient remains null during said motions.

4. Apparatus for compensating for perturbing magnetic fields in a carrier vehicle in order to permit the accurate measurement of the intensity of an external magnetic field and its perturbations, comprising, in combination:

a first magnetometer head located at a first point in said carrier vehicle, substantially on the longitudinal axis thereof, at a first distance from the barycenter of the perturbing magnetic fields and capable of generating, on its output, an e.m.f. having a frequency proportional to the intensity of the total magnetic field at said first point;

a frequency-meter connected to the output of said first magnetometer head to receive said e.m.f. therefrom and generate a first voltage proportional to said frequency, and, hence, to said total magnetic field intensity;

a second magnetometer head located at a second point in said carrier vehicle, substantially on the longitudinal axis thereof, at a second distance from said barycenter and forming with said first head a magnetic gradient-meter capable of delivering a second voltage proportional to the difference between the intensities of the total magnetic field at said second and first point;

a variable-gain amplifier the input of which is connected to the output of said gradient-meter to receive said second voltage and generate a third voltage, the gain of said variable-gain amplifier being adjusted in a predetermined manner;

a subtraction unit having two inputs connected respectively to the output of said frequency-meter to receive said first voltage therefrom and to the output of said amplifier to receive said third voltage therefrom, and an output delivering a fourth voltage proportional to the difference between said first voltage applied to its first input and said third voltage applied to its second input; and, means for measuring said fourth voltage which is proportional to the intensity of the external magnetic field to be measured at said first point.

5. Apparatus according to claim 4 wherein said second magnetometer head comprises:

a nuclear filter located at said second point, said nuclear filter having its input connected to the output of said first magnetometer head so as to receive therefrom said e.m.f. constituting a first e.m.f. and to deliver, on its output, a second e.m.f. exhibiting with respect to said first e.m.f. a phase-difference proportional to the difference between the intensities of the total magnetic field at said second point and said first point; and, a phase-meter having two inputs connected respectively to the output of said first magnetometer head to receive said first e.m.f. therefrom and to the output of said nuclear filter to receive said second e.m.f. therefrom, and an output which delivers said second voltage.

6. Apparatus according to claim 5 including, for the purpose of compensating for the perturbing magnetic fields set up by the eddy currents engendered by the carrier vehicle, at least one coil disposed adjacent said second point and a source of electric current of adjustable amplitude connected for energizing said coil, the current passing through said coil being such that the coil generates, adjacent said second point, a corrective magnetic field in phase opposition with the perturbing magnetic fields set up by said eddy currents, at an intensity such that it causes the barycenter of said perturbing magnetic fields set up by said eddy currents to coincide with the barycenter of the perturbing magnetic fields caused by the ferromagnetic mass of the carrier vehicle.

7. Apparatus according to claim 6 wherein said source is formed by at least one generating coil mounted within the carrier vehicle.

8. Apparatus according to claim 7 wherein said source is formed by three generating coils having mutually perpendicular axes.

9. Apparatus according to claim 4 wherein said second magnetometer head is capable, like said first head, of generating on its output a second e.m.f. at a frequency proportional to the intensity of the magnetic field at said second point; and, including a differential frequency-meter having two inputs connected respectively to the output of said first magnetometer head to receive said first e.m.f. therefrom and to the output of said second magnetometer head to receive said second e.m.f. therefrom, and an output which delivers said second voltage.

10. Apparatus according to claim 9 including for the purpose of compensating for the perturbing magnetic fields set up by the eddy currents engendered by the carrier vehicle, at least one coil disposed adjacent said second point and a source of electric current of adjustable amplitude connected for energizing said coil, the current passing through said coil being such that the coil generates, adjacent said second point, a corrective magnetic field in phase opposition with the perturbing magnetic fields set up by said eddy currents, at an intensity such that it causes the barycenter of said perturbing magnetic fields set up by said eddy currents to coincide with the barycenter of the perturbing magnetic fields caused by the ferromagnetic mass of the carrier vehicle.

11. Apparatus according to claim 10 wherein said source is formed by at least one generating coil mounted within the carrier vehicle.

12. Apparatus according to claim 11 wherein said source is formed by three generating coils having mutually perpendicular axes.

13. Apparatus according to claim 4 including for the purpose of compensating for the perturbing magnetic fields set up by the eddy currents energized by the carrier vehicle, at least one coil disposed adjacent said second point and a source of electric current of adjustable amplitude connected for energizing said coil, the current passing through said coil being such that the coil generates, adjacent said second point, a corrective magnetic field in phase opposition with the perturbing magnetic fields set up by said eddy currents, at an intensity such that it causes the barycenter of said perturbing magnetic fields set up by said eddy currents to coincide with the barycenter of the perturbing magnetic fields caused by the ferromagnetic mass of the carrier vehicle.

14. Apparatus according to claim 13 wherein said source is formed by at least one generating coil mounted within the carrier vehicle.

15. Apparatus according to claim 14 wherein said source is formed by three generating coils having mutually perpendicular axes.

* * * * *